UNITED STATES PATENT OFFICE 2,420,434

2 - AMINO-5-ALKENYL - 1,3,4 THIADIAZOLES AND PROCESS FOR MAKING THE SAME

Lucas P. Kyrides and Ferdinand B. Zienty, St. Louis, and Robert W. Stephenson, Webster Groves, Mo., assignors to Monsanto Chemical Company, St. Louis, Mo., a corporation of Delaware No Drawing. Application March 12, 1945, Serial No. 582,411

7 Claims. (Cl. 260—302)

This invention relates to substituted thiadiazoles and more particularly to certain 2-amino-5-alkenyl thiadiazoles.

The compounds of the present invention have the following structural formula

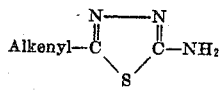

in which the alkenyl residue has from 2 to 4 carbon atoms in its structure. The 2-amino-5-alkenyl-1,3,4-thiadiazoles embraced within the scope of the present invention may be found useful for their properties as analgesics and are also useful in the preparation of other types of therapeutic or pharmaceutical agents. The acetal sulfanilyl and the sulfanilyl derivatives of the 2-amino-5-alkenyl-1,3,4-thiadiazoles of the present invention possess marked activity in the control of bacterial growth. The salts of the respective compounds employed within the scope of the present invention are also contemplated as being within the scope of this invention.

The following 5-alkenyl derivatives of 2-amino-1,3,4-thiadiazole are illustrative of the novel compounds of the present invention: vinyl, allyl, propenyl, isopropenyl, 1,2-butenyl, 2,3-butenyl, 3,4-butenyl, isobutenyl, secondary butenyl and tertiary butenyl.

The 2-amino-5-alkenyl-1,3,4-thiadiazoles of the present invention may be prepared by any desired procedure. One procedure found useful is that which involves condensation of the appropriate alkenoyl chloride with thiosemicarbazide, the solution of the resulting reaction product in water and the subsequent recovery of the product from alkaline solution. An alternative procedure is that which involves the condensation of the appropriate chloralkanoyl chloride with thiosemicarbazide, the splitting off of HCl by means of hydrolyzing agents, such as caustic soda, from the resulting reaction product and the subsequent recovery of the desired product from alkaline solution. The acetyl sulfanilyl derivatives of the substituted thiadiazoles of the present invention may be prepared by reacting N-acetylsulfanilyl chloride with the appropriate 2-amino-5-alkenyl-1,3,4-thiadiazole. Other acyl residues may be present on the sulfanilyl residue in place of the acetyl residue, for example, formyl, propionyl or butyryl residues. The sulfanilyl derivative may be prepared therefrom by hydrolysis of the appropriate acyl derivative in alkaline solution. The sulfanilyl derivative may be prepared also by reduction of the 2-(p-nitrobenzenesulfonyl)-5-alkenyl-1,3,4-thiadiazoles. The latter compounds may be prepared by reaction of p-nitrobenzenesulfonyl chloride with the appropriate 2-amino-5-alkenyl-1,3,4-thiadiazole.

The following examples will serve to illustrate suitable procedures for preparing the novel compounds of the present invention. These examples are not to be construed as limiting the scope of the invention.

EXAMPLE I

2-amino-5-propenyl-1,3,4-thiadiazole

Thirty-seven grams (0.354 mole) of crotonyl chloride was cooled by means of an ice bath and 32.2 grams (0.354 mole) of thiosemicarbazide was added. The mixture was agitated for 8 hours and cooled during that period by means of an ice bath. Thereafter the ice bath was replaced by a water bath and the agitation was continued. After nine hours of agitation the mixture became solid. The solid material was dissolved in 200 cc. of water and the solution was filtered. The filtrate was rendered alkaline with 20% caustic soda solution and the solid product was filtered off, washed and dried. Melting point 170–175° C. Weight, 11.3 grams (22.6%).

EXAMPLE II

2-(N⁴-acetylsulfanilamido)-5-propenyl-1,3,4-thiadiazole

A solution of 11 grams (0.078 mole) of 2-amino-5-propenyl-1,3,4-thiadiazole in 110 cc. of pyridine was prepared. To this solution was added slowly with agitation 21 grams of N-acetylsulfanilyl chloride. The mixture was stirred at room temperature overnight and subsequently was heated to 60° C. for one hour. Thereafter 110 cc. of water was added and the product which precipitated was filtered off, washed with water, and dried. Weight, 18.1 grams (69%). Melting point 183° C. (Decompn.). An additional 2.9 grams of the product was recovered from the mother liquor by concentration.

EXAMPLE III

2-sulfanilamido-5-propenyl-1,3,4-thiadiazole

A solution of 17.5 grams (0.0518 mole) of 2-(N⁴-acetylsulfanilamido) - 5 - propenyl - 1,3,4 - thiadiazole in 130 cc. of water containing 5.2 grams of sodium hydroxide was refluxed for 3 hours. Thereafter the solution was cooled and rendered acidic with glacial acetic acid. The product which separated was filtered off, washed with water and dried. Weight 4.5 grams (29%). Melting point 177–178° C. (Decompn.).

Example IV

2-amino-5-(1'-isobutenyl)-1,3,4-thiadiazole

A mixture of 24 grams (0.202 mole) of isobutenoyl chloride (senecioyl chloride) and 18.5 grams (0.202 mole) of thiosemicarbazide was prepared, cooled by means of an ice bath to a temperature below 10° C. and stirred for 8 hours. After this period, the mixture became solid. The ice bath was replaced with a cold water bath and the mixture was thereupon permitted to come to room temperature (approx. 25° C.). The mixture was allowed to stand for 9 hours and was thereafter dissolved in 200 cc. of water. The resulting solution was filtered. A sufficient quantity of 20% caustic soda solution was added with cooling until the solution was rendered alkaline. The product which separated out was filtered off, and washed with water, and dried at 80–90° C. Weight, 12.6 grams (40.7%). Melting point 193–197° C.

Example V

2-(N⁴-acetylsulfanilamido)-5-(1'-isobutenyl)-1,3,4-thiadiazole

A solution of 15.5 grams (0.1 mole) of 2-amino-5-(1'-isobutenyl)-1,3,4-thiadiazole in 140 cc. of dry pyridine was prepared. The temperature of the solution was regulated to a point below 30° C. To the solution was added slowly with agitation 27 grams of N-acetylsulfanilyl chloride. The mixture was agitated overnight and thereafter was heated at 50–60° C. for one hour. Thereupon 140 cc. of water was added and 160 cc. of the resulting mixture was distilled off. The desired product crystallized out in the still residue upon cooling and was thereafter filtered off and dried at 80–90° C. Weight, 30.6 grams (87.4%). Melting point 240° C.

Example VI

2-sulfanilamido-5-(1'-isobutenyl)-1,3,4-thiadiazole

Five grams (0.0142 mole) of 2-(N⁴-acetylsulfanilamido)-5-(1'-isobutenyl)-1,3,4-thiadiazole was dissolved in a solution of 1.5 grams of sodium hydroxide in 37.5 cc. of water at the boiling point of the solution and the resulting mixture was refluxed for 3 hours. The mixture was thereupon cooled and acidified with glacial acetic acid. The product was filtered off and dried at 70–80° C. overnight. Weight, 4.2 grams. Melting point approx. 235° C.

Example VII

2-amino-5-allyl-1,3,4-thiadiazole

Seventy-one grams (0.5 mole) of gamma-chloro-butyryl chloride was cooled by means of an ice bath and 39 grams (0.5 mole) of thiosemicarbazide was added. The mixture was agitated for 8 hours and cooled during that period by means of an ice bath. Thereafter the ice bath was replaced by a water bath and the agitation was continued. When the mixture became solid, the solid material was dissolved in 200 cc. of water and the solution was filtered. The filtrate was rendered alkaline with 20% caustic soda solution and the solid product was filtered off. The wet cake, 2-amino-5-(3'-chloropropyl)-1,3,4-thiadiazole, was placed in 400 cc. of 50% alcohol containing 50 grams of sodium hydroxide. Thereafter the mixture was refluxed for 3 hours, diluted with water and the alcohol was distilled off. After cooling, the solid product, 2-amino-5-allyl-1,3,4-thiadiazole, was filtered off and dried.

In place of gamma-chlorobutyryl chloride, 71 grams (0.5 mole) beta-chlorobutyryl chloride may be employed. Likewise, in place of gamma-chlorobutyryl chloride, 52 grams (0.05 mole) of vinyl acetyl chloride may be employed.

Example VIII

2-(N⁴-acetylsulfanilamido)-5-allyl-1,3,4-thiadiazole

A solution of 14 grams (0.1 mole) of 2-amino-5-allyl-1,3,4-thiadiazole in 130 cc. of dry pyridine was prepared. To this solution was added slowly with agitation, 18.2 grams of N-acetylsulfanilyl chloride. The mixture was stirred at room temperature overnight and subsequently was heated to 60° C. for one hour. Thereafter 110 cc. of water was added and the product which precipitated was filtered off, washed with water and dried.

Example IX

2-sulfanilamido-5-allyl-1,3,4-thiadiazole

A solution of 13.3 grams (0.05 mole) of 2-(N⁴-acetylsulfanilamido)-5-allyl-1,3,4-thiadiazole in 150 cc. of water containing 5.2 grams of sodium hydroxide was refluxed for 3 hours. Thereafter the solution was cooled and rendered acidic with glacial acetic acid. The product which separated was filtered off, washed with water and dried.

Example X

2-amino-5-vinyl-1,3,4-thiadiazole

A mixture of 56 grams (0.5 mole) of beta-chloropropionyl chloride and 39 grams (0.5 mole) of thiosemicarbazide was prepared and agitated for 2 hours at a temperature below 10° C. Thereafter the temperature of the mixture was allowed to rise to room temperature (approx. 25° C.). After several hours of agitation, the reaction mixture was dissolved in approx. 400 cc. of warm 50% alcohol containing 50 grams of sodium hydroxide. Thereafter the mixture was refluxed for 3 hours, water was added, the alcohol was distilled off, and the mixture was cooled. The solid product, 2-amino-5-vinyl-1,3,4-thiadiazole, was filtered off, washed and dried. In place of beta-chloropropionyl chloride, alpha-chloropropionyl chloride may be employed.

Example XI

2-(N⁴-acetylsulfanilamido)-5-vinyl-1,3,4-thiadiazole

A solution of 12.7 grams (0.1 mole) of 2-amino-5-vinyl-1,3,4-thiadiazole in 150 cc. of dry pyridine was prepared. The temperature of the solution was regulated to a point below 30° C. To the solution was added slowly with agitation 78.2 grams of N-acetylsulfanilyl chloride. The mixture was agitated overnight and thereafter was heated at 50–60° C. for one hour. Thereupon 140 cc. of water was added and 150 cc. of the resulting mixture was distilled off. The desired product crystallized out in the still residue upon cooling and was thereafter filtered off and dried.

Example XII

2-sulfanilamido-5-vinyl-1,3,4-thiadiazole

Ninety-nine grams (0.05 mole) of 2-(N⁴-acetylsulfanilamido)-5-vinyl-1,3,4-thiadiazole was dissolved in a solution of 3 grams sodium hydroxide in 80 cc. of water at the boiling point of the solution and the resulting mixture was refluxed for 3 hours. The mixture was thereupon cooled and acidified with glacial acetic acid. The product was filtered off, washed with water and dried at 70–80° C. overnight.

EXAMPLE XIII

*2-amino-5-isopropenyl-1,3,4-thiadiazole*

A mixture of 37 grams (0.354 mole) of methacroyl chloride and 32.2 grams (0.354 mole) of thiosemicarbazide was prepared. The mixture was agitated for 8 hours and cooled during that period by means of an ice bath. Thereafter the ice bath was replaced by a water bath and the agitation was continued until the mixture became solid. The solid material was dissolved in 200 cc. of water and the solution was filtered. The filtrate was rendered alkaline with 20% caustic soda solution and the solid product was filtered off, washed and dried.

As an alternative procedure, a mixture of 71 grams (0.5 mole) of beta-chloroisobutyryl chloride and 39 grams (0.5 mole) of thiosemicarbazide was prepared and agitated for 2 hours at a temperature below 10° C. Thereafter the temperature was allowed to rise to room temperature (approx. 25° C.). After several hours of agitation, the reaction mixture was dissolved in approx. 400 cc. of warm 50% alcohol containing 50 grams of sodium hydroxide. Thereafter the mixture was refluxed for 3 hours, water was added, the alcohol distilled off and the mixture was cooled. The solid product was filtered off, washed and dried.

EXAMPLE XIV

*2-(N⁴-acetylsulfanilamido)-5-isopropenyl-1,3,4-thiadiazole*

This compound was prepared according to the procedure described in Example 2, substituting 11 grams of 2-amino-5-isopropenyl-1,3,4-thiadiazole for the 2-amino-5-propenyl-1,3,4-thiadiazole employed in that procedure.

EXAMPLE XV

*2-sulfanilamido-5-isopropenyl-1,3,4-thiadiazole*

This compound was prepared according to the procedure described in Example 3, substituting 17.5 grams of 2-(N⁴-acetylsulfanilamido)-5-isopropenyl-1,3,4-thiadiazole for the 2-(N⁴-acetylsulfanilamido)-5-propenyl-1,3,4-thiadiazole employed in that procedure.

The 2-amino-5-alkenyl-1,3,4-thiadiazoles of the present invention may also be employed in the form of the acid salt derivatives, such as the hydrochloride, sulfate, benzoate or acetate. These salt derivatives may be prepared by reacting in equimolecular proportions the 2-amino-5-alkenyl-1,3,4-thiadiazole with the appropriate acid in aqueous or organic solvent solution, according to the procedure known in this art for the preparation of acid salt derivatives of basic organic nitrogen compounds.

While the compositions of the present invention have been described and illustrated in the foregoing specification and examples, it is to be observed that the present invention is not to be construed as being limited in respect to any particular substances, proportions, conditions or combinations except as defined in the claims.

We claim:

1. 2-amino-5-alkenyl-1,3,4-thiadiazoles of the formula type

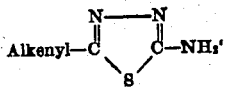

in which the alkenyl residue has from 2 to 4 carbon atoms and salts thereof, prepared for use as therapeutic agents and as intermediates for therapeutic agents.

2. 2-amino-5-vinyl-1,3,4-thiadiazole, prepared for use as a therapeutic agent and as an intermediate for therapeutic agents.

3. 2-amino-5-propenyl-1,3,4-thiadiazole, prepared for use as a therapeutic agent and as an intermediate for therapeutic agents.

4. 2-amino-5-isopropenyl-1,3,4-thiadiazole, prepared for use as a therapeutic agent and as an intermediate for therapeutic agents.

5. A process for preparing 2-amino-5-alkenyl-1,3,4-thiadiazoles comprising condensing an alkenoyl chloride having from 2 to 4 carbon atoms in the alkenyl radical thereof with thiosemicarbazide.

6. A process for preparing 2-amino-5-alkenyl-1,3,4-thiadiazoles, comprising condensing a chloroalkenoyl chloride having from 2 to 4 carbon atoms in the alkyl radical thereof with thiosemicarbazide, and reacting the resulting 2-amino-5-chloralkyl-1,3,4-thiadiazole with a hydrolyzing agent until HCl has been removed from the compound.

7. Acid salt derivatives of the compounds defined in claim 1.

LUCAS P. KYRIDES.
FERDINAND B. ZIENTY.
ROBERT W. STEPHENSON.

REFERENCES CITED

The following references are of record in the file of this patent:

UNITED STATES PATENTS

| Number | Name | Date |
|---|---|---|
| 2,358,031 | Roblin, Jr. et al. | Sept. 12, 1944 |
| 2,331,749 | Watt | Oct. 12, 1943 |

OTHER REFERENCES

Chemical Abstract, vol. 36, 70094, 1942.